United States Patent [19]
Ohsato

[11] Patent Number: 5,515,348
[45] Date of Patent: May 7, 1996

[54] OPTICAL DISK PICKUP DEVICE WITH TILT COMPENSATION BY ELECTROSTRICTION

[75] Inventor: Kiyoshi Ohsato, Chiba, Japan

[73] Assignee: Sony Corporation, Japan

[21] Appl. No.: 195,694

[22] Filed: Feb. 16, 1994

Related U.S. Application Data

[62] Division of Ser. No. 975,507, Nov. 12, 1992, abandoned.

[30] Foreign Application Priority Data

Nov. 20, 1991 [JP] Japan .................................. 3-332451
Dec. 5, 1991 [JP] Japan .................................. 3-348328

[51] Int. Cl.$^6$ ................................................. G11B 7/095
[52] U.S. Cl. ..................... 369/44.23; 369/44.32; 369/54
[58] Field of Search ............................ 369/44.23, 112, 369/44.32, 54, 44.12

[56] References Cited

U.S. PATENT DOCUMENTS

| | | | |
|---|---|---|---|
| 4,661,943 | 4/1987 | Ikeda | 369/44.32 X |
| 4,737,946 | 4/1988 | Yamashita et al. | 369/44.12 |
| 4,816,665 | 3/1989 | Hsu | 250/201 |
| 4,861,975 | 8/1989 | Kino et al. | 250/201.4 |
| 4,937,808 | 6/1990 | Shimada et al. | 369/44.11 X |
| 5,027,336 | 6/1991 | Sugiura | 369/44.32 X |

FOREIGN PATENT DOCUMENTS

| | | |
|---|---|---|
| 0189932A3 | 8/1986 | European Pat. Off. . |
| 0280208A2 | 8/1988 | European Pat. Off. . |
| 0439876A1 | 8/1991 | European Pat. Off. . |
| 60-187920 | 9/1985 | Japan . |
| 62-61016 | 3/1987 | Japan . |

OTHER PUBLICATIONS

Patent Abstracts of Japan, vol. 10, No. 41 (P–429), 18 Feb. 1986 & JP 60–187920 (Matsushita Denki Sangyo KK).
Patent Abstracts of Japan, vol. 12, No. 345 (P–759), 16 Sep. 1988 & JP-A-63 103 445 (Fujitsu General Ltd).
Patent Abstracts of Japan, vol. 14, No. 158 (P–1027), 27 Mar. 1990 & JP-A-20 14 433 (Toshiba Corp.).
Patent Abstracts of Japan, vol. 9, No. 276 (P–402), 2 Nov. 1985 & JP-A-60 121 546 Sony (KK).
Patent Abstracts of Japan, Group No. P714, vol. 12, No. 199, Abs Pub Date Jun. 9, 1988 (63–2125).
The Photonics Dictionary, 1991 pp. D–102, D–103.

Primary Examiner—W. R. Young
Attorney, Agent, or Firm—Limbach & Limbach

[57] ABSTRACT

An optical pickup is adapted for recording and/or reproducing signals by radiating a light beam from a light source on an optical recording medium via an object lens. The optical pickup includes a light receiving device for receiving a return light from the optical recording medium, and a focusing error detecting unit for detecting an amount of deviation of the focal point along the optical axis. The measurement of a focusing error is based on signals from the light receiving device. The optical pickup further includes an electrostriction device arranged on a path of light outgoing from the light source to the optical recording medium and having a central section and a peripheral section exhibiting a phase difference from each other depending on an applied voltage. Focusing errors may be detected with high accuracy with the optical pickup. A focusing servo device compensates for the focusing error detected by controlling the focal point along the optical axis using a focusing servo device. Depending on error detection signals from the focusing error detection unit, a rough servo is carried out by an the object lens driving unit to the vicinity of the depth of focus, and a fine servo is carried out by the electrostriction device within the range of the depth of focus.

6 Claims, 8 Drawing Sheets

OPTICAL DISK PICKUP DEVICE WITH TILT COMPENSATION BY ELECTROSTRICTION

This is a divisional of application Ser. No. 07/975,507, filed Nov. 12, 1992, now abandoned.

BACKGROUND OF THE INVENTION

1. Field of the Invention

This invention relates to an optical pickup device for recording/reproducing information signals on or from an optical recording medium by radiating a light beam thereto from a light source, and a focusing servo device for controlling the focusing position along the optical axis of the optical pickup device.

2. Description of the Related Art

There has hitherto been known a magneto-optical or a phase change type optical recording medium as an optical recording medium for recording and/or reproducing information signals by means of a light beam from a laser light source radiated thereto. The magneto-optical recording medium, as an example, is comprised of a transparent substrate or a light-transmitting substrate, formed of, for example, a light transmitting synthetic resin, such as polycarbonate. The magneto-optical medium further comprises a magnetic layer, a dielectric layer and a surface protective layer, stacked on a major surface of the substrate. The magnetic layer, which may be a rare earth—transition metal alloy thin film, has an axis of magnetization perpendicular to the film surface and exhibits superior photomagnetic effects. Information signals may be recorded or reproduced by radiating a light beam, such as a laser beam, from the transparent substrate side.

In such optical recording medium, it is desirable to improve the recording density further in view of the fact that digital video signals can require upwards of ten times the data volume of digital audio signals. Furthermore, there is a demand for smaller size recording media. For instance, there is a demand for smaller digital audio disc players, which would require smaller discs, and concomitantly, higher density of data storage. Similarly, for recording general computer data, there is an increasing demand for a smaller sizes and larger recording capacities of the recording medium, in order to accommodate increasingly popular notebook or diary size computer devices.

The information recording density on the recording medium is governed by the wavelength $\lambda$ of the laser light and the numerical aperture NA of an object lens, so that when increasing the recording density, it is necessary to decrease the wavelength $\lambda$ of the laser light and/or for the numerical aperture NA to be increased. One widely used system for high density reproduction is the co-focal point detection optical system. In this system a pinhole is provided at a focal point of a lens at which the return light from the disc is converges. This convergence of light is detected by a light receiving or detecting element.

The focusing servo devices in such high density optical disc systems have a deficiency in that the defocusing tolerance becomes extremely narrow. For example, an optical pickup device making use of a light source of a short wavelength laser light, such as green or blue light, or an object lens having a larger NA value, has a smaller or shallower depth of focus. On the other hand, with an optical pickup device employing the so-called co-focal point detection system, the light volume of the detected light undergoes extremely large changes with defocusing due to its sharp depth response characteristics.

The conventional focusing servo device shifts the object lens along the optical axis, i.e. in the focusing direction, by means of an electromagnetic coil. It is difficult with the conventional servo device to inhibit focusing fluctuations with respect to resolution and bandwidth due to high frequency disturbances produced within the depth of focus, such as minute fluttering of the rotating discs. There is, therefore, a need for a device for accurately detecting focal point error signals within the depth of focus.

Focusing fluctuation problems are compounded by the fact that the optical disc is subject not only to warping in the radial direction but to undulations in the circumferential direction. Furthermore, the optical disc is occasionally loaded in a tilted state on the recording/reproducing apparatus. That is, in the recording/reproducing apparatus, the light spot on the information recording surface tends to be distorted not only in the radial direction but also along the recording track(s).

If the spot shape is changed so that its long axis direction coincides with the recording track direction, inter-symbol interference is produced in the reproduced signals in the recording/reproducing apparatus, so that, if the pits are close to one another, the recording signals cannot be reproduced accurately. Conversely, if the long axis direction is coincident with the radial direction of the optical disc, crosstalk is produced between the recording tracks which renders it impossible to record the information correctly when the track pitch is narrow.

This means that if the recording density is to be improved in the conventional recording and/or reproducing apparatus, it becomes necessary with the conventional recording/reproducing apparatus to correct for the tilt of the optical disc promptly to compensate for such changes in the optical disc orientation.

However, since these changes in the optical disc are composed of components changed with disc rotation at a frequency from tens of cycles per second (Hz), to upwards of one hundred Hz, it is not possible with the conventional system of correcting the position of the disc to entirely correct for these changes in the optical disc.

Recording density might also be improved by decreasing the tilt of the optical disc and thereby decreasing orientation changes during playback. However, even granting that the tilt of the optical disc may be tolerated up to 0.6° by employing an object lens having a numerical aperture of 0.45, the tolerable range of the tilt is decreased to 0.25° with the use of an object lens having the numerical aperture of 0.6. This is because the coma aberration is changed in proportion to the numerical aperture of the object lens cubed. Consequently, an object lens having a higher numerical aperture required for improving the recording density cannot be employed. Difficulties are met in the application of the above-described methods of adapting for disc orientation changes in order to improve the recording density.

OBJECTS AND SUMMARY OF THE INVENTION

In view of the above-described status of the art, it is a primary object of the present invention to provide an optical pickup and a focusing servo device in which focusing servo may perform with high accuracy even if the defocusing tolerance is reduced due to the shorter wavelength of the light source or to the high numerical aperture of the object lens as is the case when recording and/or reproducing a high density optical disc.

In view of the above objects, the present invention provides an optical pickup for recording/reproducing signals on or from an optical recording medium by radiating a light beam from a light source to the optical recording medium via an object lens. The optical pickup device comprises light receiving means for receiving a return light from the optical recording medium, focusing error detection means for detecting a focusing error by signals from said light receiving means, said focusing error being an amount of deviation of the focal point of said object lens along the optical axis, and an electrostriction device arranged in an outgoing light path from said light source to said recording medium, said electrostriction device having a central region and a peripheral region exhibiting a phase difference from each other in an amount corresponding to an applied voltage.

The present invention also provides a focusing servo device for controlling the focal point along the optical axis of an optical pickup adapted for recording/reproducing signals on or from an optical recording medium by radiating a light beam from a light source to the optical recording medium via an object lens. The focusing servo device comprises object lens driving means for moving said object lens along the optical axis, focusing error detection means for detecting a focusing error by signals from a light receiving element adapted for receiving the return light from the optical recording medium, said focusing error being an amount of deviation of the focal point along the optical axis, an electrostriction device or a piezoelectric device arranged in an outgoing light path from said light source to said recording medium, said electrostriction device having a central region and a peripheral region exhibiting a phase difference from each other in an amount corresponding to an applied voltage, and control means. The control means effects, responsive to error detection signals from said focusing error detecting means, a rough servo adjustment up to the vicinity of the depth of focus by said object lens driving means and a fine servo adjustment within the range of the depth of focus by said electrostriction device.

As the electrostriction device or the piezoelectric device, a PLZT device comprised of a transparent electrode of e.g. indium tin oxide (ITO) divided into a central electrode region and a peripheral electrode region and deposited on a transparent piezoelectric plate, such as a PLZT plate, may be employed. By applying a differential voltage to the central and peripheral electrode regions of the so-called PLZT device, a phase difference may be produced between the central and peripheral electrode regions to enable the focal point to be moved within the range of the depth of focus.

A co-focal point detecting optical means may be employed as the focusing error detection means. This co-focal point detecting optical means is comprised of a light receiving element or a photodetector arranged directly at the back of a pinhole plate placed at a focal point produced by light convergence produced by a lens. The focusing error within the depth of focus may be detected accurately by taking the difference of outputs of the photodetectors placed directly at the back of the pinholes in the pinhole plate arranged respectively ahead of and beyond the focal point along the optical axes of beams of return light from the optical medium.

Alternatively, for fine and rough focusing servo detection, two photodetectors each having a pattern of light receiving section comprising a light receiving region at the center of the optical axis of a beam of return light from the optical medium and a light receiving region therearound can be used for detecting errors in the focal point. The differential between the central regions of the photodetectors is measured to detect fine focusing error signals within the range of the depth of focus, while the differential between the central and peripheral regions of the photodetectors is measured to detect rough focusing errors up to the vicinity of the range of the depth of focus.

With the focusing servo device according to the present invention, the focusing error within the range of the depth of focus may be detected accurately to permit fine focusing servo to allow a shorter wavelength of the light source in the high density recording medium to simultaneously allow a high numerical aperture of the object lens and co-focal point detection.

Other objects and advantages of the present invention will become apparent from the following description.

DETAILED DESCRIPTION OF THE PREFERRED EMBODIMENTS

Figure 1:
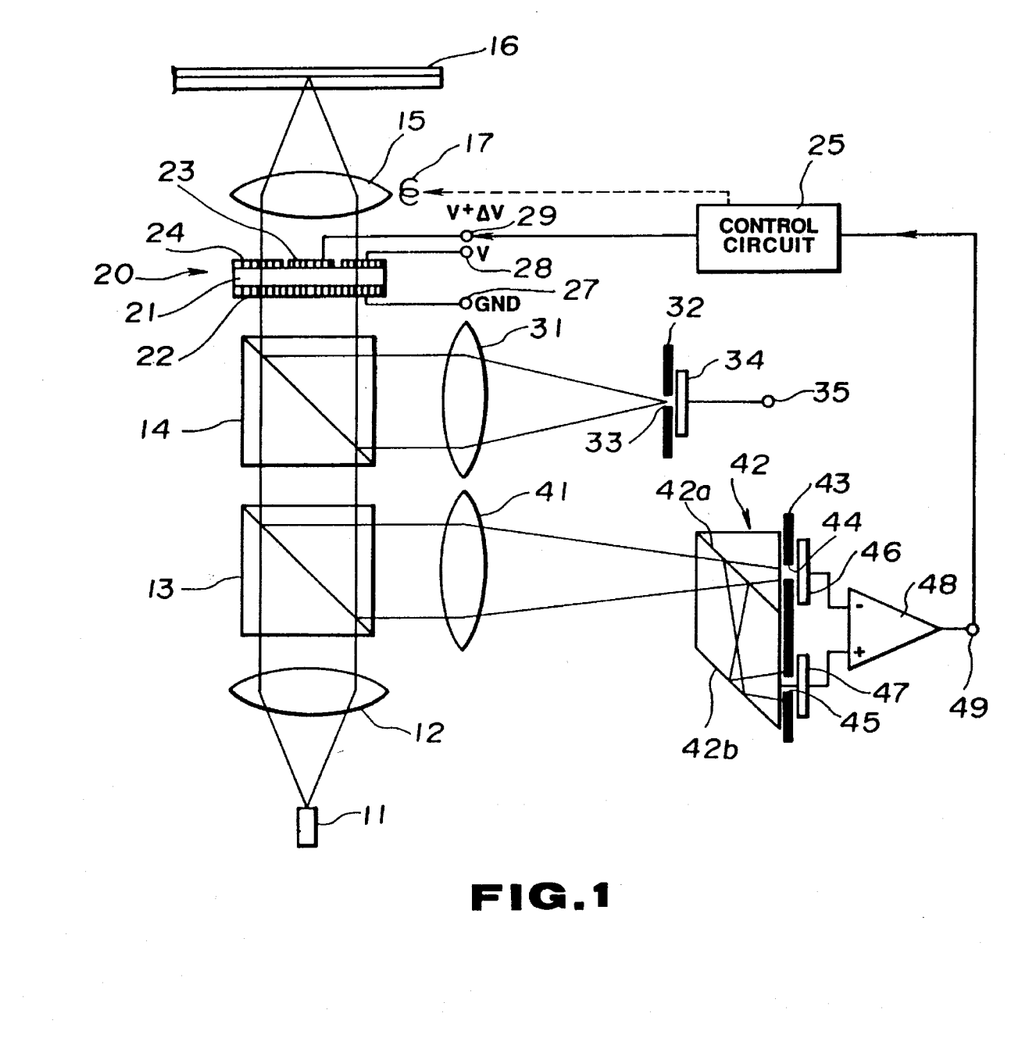
FIG. 1 is a schematic view showing a general arrangement of an optical disc recording/reproducing apparatus according to a first embodiment of the present invention.

Referring to FIG. 1 showing a schematic arrangement of an optical disc recording/reproducing apparatus, an optical pickup and a focusing servo device according to a first embodiment of the present invention will be explained.

In the optical disc recording/reproducing apparatus, a laser light source, such as a semiconductor laser 11, is employed as a light source. The laser light radiated from the semiconductor laser 11 is collimated by a collimator lens 12 so as to be radiated on a recordable optical recording medium, such as a magneto-optical disc 16, via beam splitters 13, 14 and an object lens 15. The laser beam, radiated on the magneto-optical disc 16, is incident on and reflected by the recording layer of the magneto-optical disc 16 so as to be incident on and partially reflected by beam splitter 14 via object lens 15 before being incident on a photodetector 34, such as a photodiode via a lens 31. A pinhole plate 32 having a pinhole 33 bored therein is provided directly in front of the photodetector 34 which forms an optical system for co-focal point detection. A detection output from photodetector 34 is taken out via an output terminal 35.

A portion of the return light from optical disc 16 is incident via beam splitter 14 on the other beam splitter 13 so as to be converged by converging lens 41 so as to be incident on a beam splitting prism 42. The return light incident on beam splitting prism 42 is split into a light transmitted through a beam splitting surface 42a and into a light reflected by the beam splitting surface 42a. The transmitted light is incident on a pinhole 44 in a pinhole plate 43, while the reflected light is again reflected by a reflecting surface 42b so as to be incident on another pinhole 45 in the pinhole plate 43. Light detectors, such as photodetectors 46, 47, are arranged directly behind the pinholes 44, 45, respectively. It is noted that the photodetectors 46, 47 are arranged ahead and beyond the focal point, respectively. Outputs from the photodetectors 46, 47 are differentially amplified by a differential amplifier 48, which is outputted at an output terminal 49.

Figure 2:
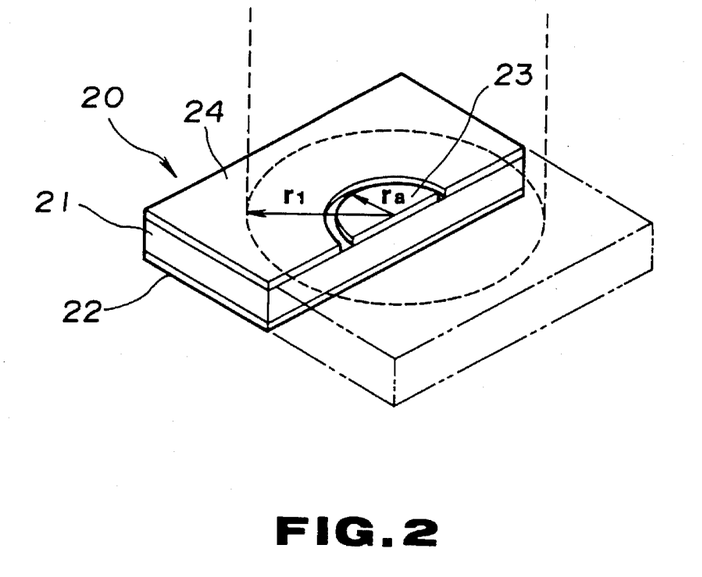
FIG. 2 is a perspective view of an electrostriction device employed in the embodiment of FIG. 1, a portion thereof being cut away.

An electrostriction element 20 is placed between the semiconductor laser 11 as the light source and the magneto-optical disc 16 as the optical recording medium. The electrostriction element 20 is comprised of a transparent piezoelectric plate or electrostriction plate 21, one surface of which is coated with a transparent electrode 22 (entire surface electrode) of, for example, indium tin oxide (ITO) and the other surface of which is disposed on a central transparent electrode 23 and a transparent peripheral electrode 24, as also shown in FIG. 2. The piezoelectric plate may for example be comprised of PLZT or zirconium—lead titanate based ceramic, that is a PbZrO$_3$—PbTiO$_3$ solid solution (called PZT) admixed with lanthanum (La), and is a plate of a transparent ceramic electrostriction element or a piezoelectric plate. When electrodes are fitted to both sides of the transparent piezoelectric plate 21 and an electric voltage is applied across these electrodes, the piezoelectric plate 21 changes in thickness.

Figure 3:
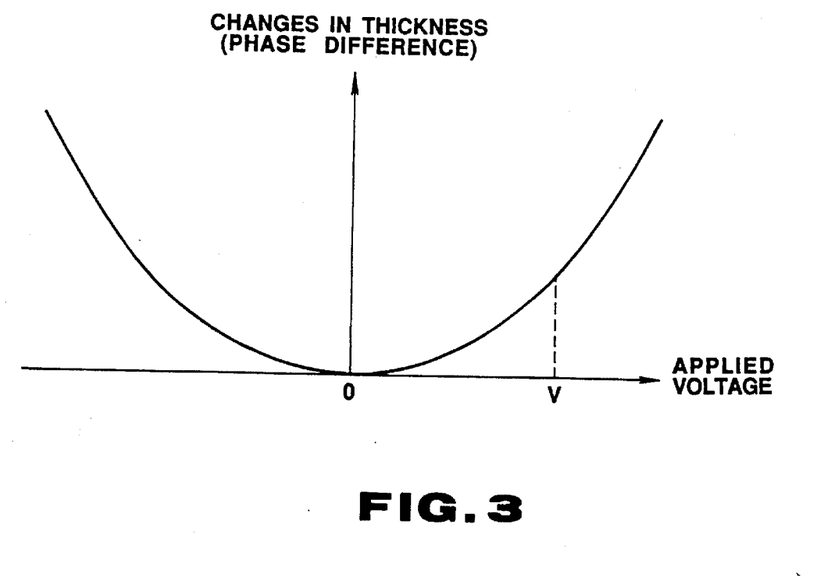
FIG. 3 is a graph showing the relation between the applied voltage and the thickness of the electrostriction device employed in the embodiment shown in FIG. 1.

It will be seen from FIG. 3, which is a graph showing changes in thickness of a PLZT device with changes in voltage applied across both electrodes of the device that plate thickness changes with applied voltage according to a quadratic function. Consequently, by applying a voltage to the central transparent electrode (central electrode) 23 of the piezoelectric plate 21 which has a difference (potential difference) $\Delta V$ from a voltage applied to the transparent peripheral electrode (peripheral electrode) 24 of the piezoelectric plate 21, an optical phase difference may be produced.

In the embodiment of FIG. 1, a grounding voltage (GND) is applied to the entire surface electrode 22 via a terminal 27, while a predetermined constant voltage V is applied to the peripheral electrode 24 via terminal 28 and a control voltage (V+$\Delta V$) from a control circuit 25 is applied the central electrode 23 via terminal 29. The control circuit 25 performs a focusing servo operation responsive to focusing error signals from terminal 49, in such a manner that, when the focusing error is larger and outside the depth of focus, a driving coil 17 for shifting the object lens 15 along the optical axis or in the focusing direction is driven for performing a rough servo control operation. When the focusing error is within the depth of focus, the control voltage (V+$\Delta V$) is supplied to provide a phase difference between the central region and the peripheral region of the electrostriction device 20, such as the PLZT device, to effect a fine focusing servo control operation.

The principle of effecting a focal point control by providing a phase difference between the central region and the peripheral region of a light flux will now be explained. As disclosed in U.S. Pat. No. 4,861,975, entitled "Variable Focusing Optical System Employing an Electrical-Optical Material and Method", affording a phase difference between the center and the periphery of a light flux is equivalent to affording a defocusing aberration within a wavelength. Therefore, the focal point position may be moved even although the position is within the depth of focus.

On the other hand, the so-called PLZT device, employed as the electrostriction device 20, is changed in thickness against the applied voltage according to a quadratic function as shown in FIG. 3 (electrostriction effect). Consequently, by controlling the voltage (V+$\Delta V$) applied by control circuit 25 for affording a phase difference proportional to a focal point error between the center and a periphery of the light flux, the focal point position may be moved within the range of the depth of focus to effect a fine focusing servo control operation.

Figure 4:
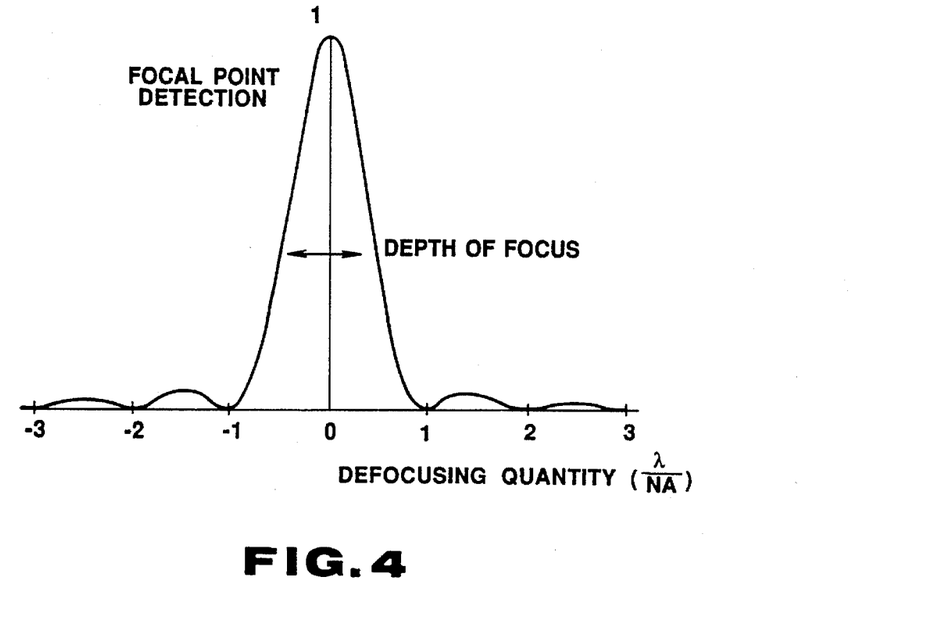
FIG. 4 is a graph showing depth response characteristics in the co-focal point detection in the embodiment shown in FIG. 1.

The method for accurately detecting the focal point error within the depth of focus as discussed above will now be explained. If the medium (i.e., disc) has a mirror surface and the pinhole 33 is small enough in size, depth response characteristics of the co-focal point detection at the photodetector 34 may be expressed by the formula $$l(u) = (\sin(\pi u)/\pi u)^2 \tag{1}$$

where u is a normalized defocusing quantity in $\lambda/NA^2$ and l(u) is a light intensity. When plotted along the optical axis, the formula (1) may be represented as shown in FIG. 4. For example, the value of $\lambda/NA^2$, as a unit for u, is 3.12 μm for e.g. the wavelength of the laser light $\lambda$ of 780 nm and the numerical aperture NA of the object lens of 0.5. This value is that on the disc 16 and the corresponding value on the photodetector, on which the return light is incident, is 312 μm for the numerical aperture NA of e.g. 0.5, depending on the magnification factor of the converging lens.

On the other hand, the defocusing quantity z corresponding to the depth of focus, is given by $$z = (\tfrac{1}{2})(\lambda/NA^2) \tag{2}$$

such that the normalized defocusing quantity is equal to 0.5. It is seen from FIG. 4 that, for defocusing for the depth of focus of ±0.5, the amount of the detected light is lowered to 40%.

Figure 5:
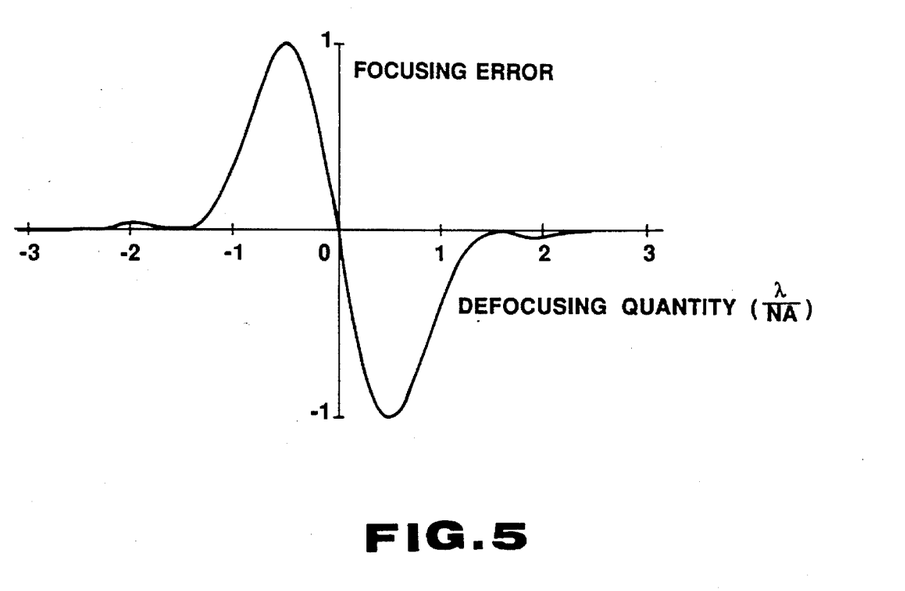
FIG. 5 is a graph showing focal point error detection signals in the embodiment shown in FIG. 1

It will be appreciated from the foregoing that it is necessary in co-focal point detection to decrease defocusing to a value of less than the depth of focus. The present invention is directed to detection of the focusing error signals within the depth of focus by utilizing the depth response of the co-focal point detection. Specifically, the difference between the outputs of the photodetectors 46, 47 arranged directly after the pinholes 44, 45 placed ahead and beyond the focal point, respectively, as shown in FIG. 1 is measured to allow highly accurate focal point detection even when the focal point is within the depth of focus. Taking the difference between the detection outputs is equivalent to taking the difference in height of two response curves, as shown in FIG. 4, shifted apart in a horizontal direction with respect to each other. This yields a focal point error signal having an S-shaped curve as shown in FIG. 5 which may be detected from output terminal 49. The curve shown in FIG. 5 is equivalent to a differential output which is produced when the two pinholes 44, 45 are shifted along the optical axis relative to the focal point position by an amount equal to the depth of focus. This pinhole configuration is most suited to detection of the focal point within the range of the depth of focus.

Meanwhile, in the embodiment shown in FIG. 1, the pinhole plate 32 having the pinhole 33 is arranged directly in front of the photodetector 34, and the pinhole plate 43 having the pinholes 44, 45 is arranged directly in front of the photodetectors 46, 47. However, in effect, the light receiving sections of the photodetectors 34, 46, 47 may be designed as shown in FIGS. 6 and 7 so that the pinhole plates 32, 43 may be eliminated and signal detection of ordinary signals not employing the depth response of the co-focal point detection may be effected by the same photodetector.

Figure 6:
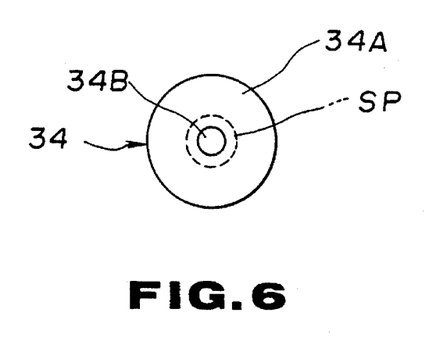
FIG. 6 is a schematic plan view showing a light receiving pattern of a photodetector 34 of an embodiment in which the pinhole plate 32 of the embodiment shown in FIG. 1 is not employed.

Referring to FIG. 6, showing a pattern of the light-receiving section of the photodetector 34 when the pinhole plate 32 is not employed, the light-receiving section is made up of a light-receiving region 34B corresponding in shape and size to the pinhole 33 and a peripheral light-receiving section therearound. The peripheral light-receiving section 34A is of such a size and shape that a beam spot SP of the return light is not deviated out of the outer rim of the light-receiving section 34A. The central light-receiving section 34B is of a diameter smaller than the diameter of the beam spot SP. In this manner, the above-described co-focal point detection signal is detected by the central light-receiving region 34B, while the customary detection signal is produced as a sum of outputs of the light-receiving sections 34A and 340.

Figure 7:
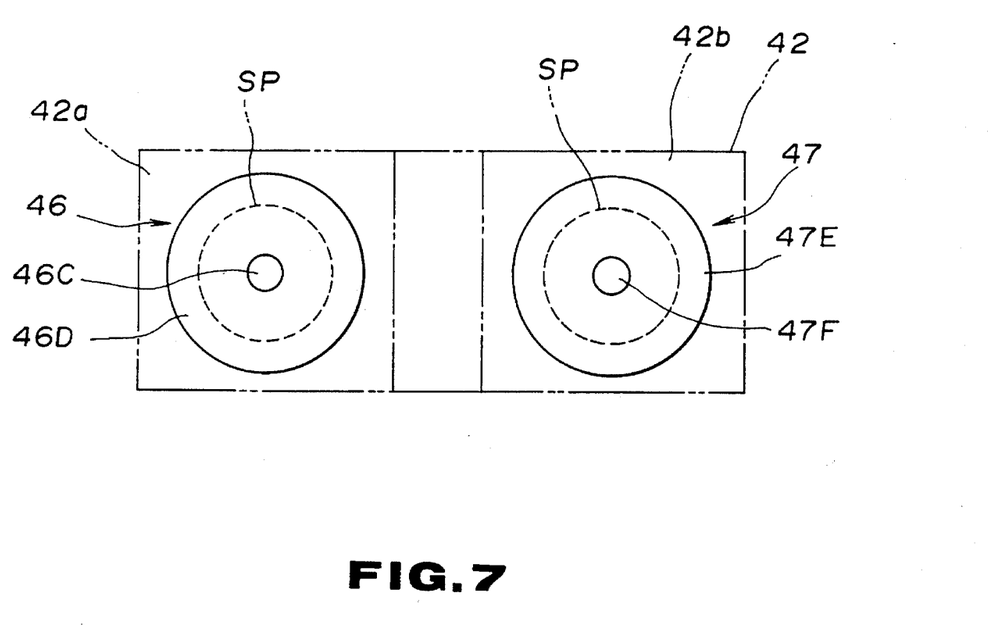
FIG. 7 is a schematic plan view showing a light receiving pattern of photodetectors 46, 47 of an embodiment in which the pinhole plate 32 of the embodiment shown in FIG. 1 is not employed.

FIG. 7 shows a pattern of light-receiving sections of the photodetectors 46, 47 when the pinhole plate 43 is not employed, wherein the beam splitting prism 42 and the reflective surfaces 42a, 42b are indicated by phantom lines. In FIG. 7, the photodetector 46 has a light-receiving region 46C corresponding in size and shape to the pinhole 44 and a light-receiving region 46D therearound, while the photodetector 47 has a light-receiving region 47F corresponding in size and shape to the pinhole 45 and a light-receiving region 47E therearound. Consequently, if the detection outputs from these light-receiving regions 46C, 46D, 47E and 47F are indicated $S_C$, $S_D$, $S_E$ and $S_F$, the high accuracy focal point error detection signals taking advantage of the co-focal point detection for driving the above-described electrostriction element 20 may be derived from $(S_C-S_F)$ which is a difference signal of the detection signals from the central light-receiving regions 46C and 47F, while the focal point error signal for exciting and driving the driving coil 17 for driving the object lens 15 may be derived from $(S_C-S_D)-$ $(S_F-S_E)$. The lens driving focal point error signals may be designed to produce an S-shaped curve in which the amount of shift along the optical axis is of the order of 5 and the amplitude is of the order of $-3$ to $-4$ in terms of $\lambda/NA^2$ as the unit.

With the above-described focusing servo it becomes possible to cope with minute high-frequency disturbances of the order of $\pm 1$ μm due to in-plane deviations of the disc. This is because of the high response velocity of the fine servo made possible by the electrostriction element 20. As a result, high-frequency disturbances may be inhibited effectively.

An optical disc recording/reproducing apparatus, to which an optical pickup device as a second embodiment of the present invention is applied, is hereinafter explained.

Figure 8:
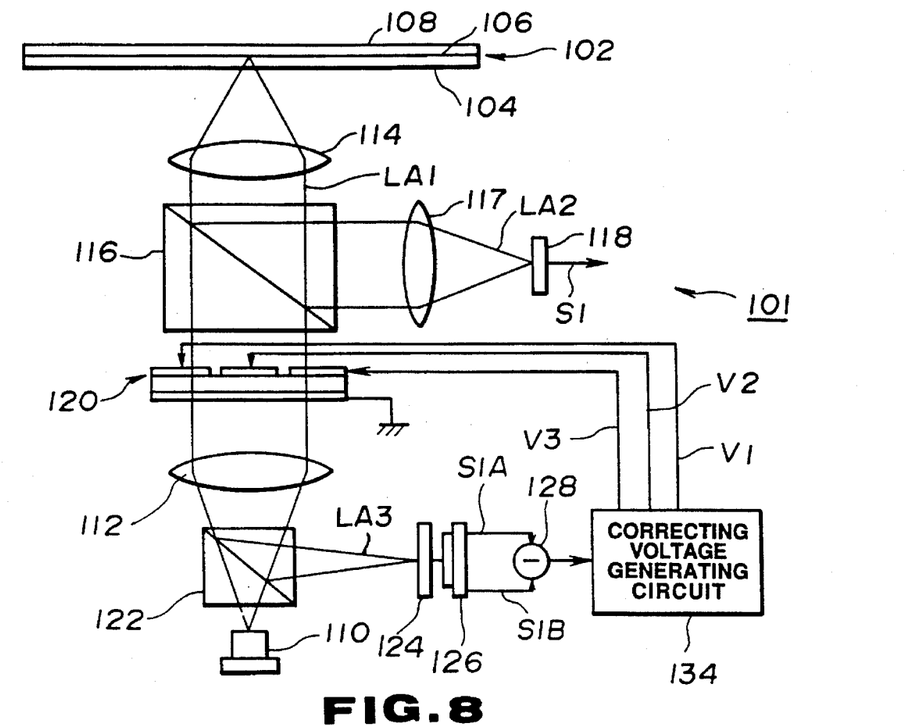
FIG. 8 is a schematic view showing a general arrangement of an optical disc reproducing apparatus according to a second embodiment of the present invention.

FIG. 8 shows an optical disc recording/reproducing apparatus 101, in its entirety, for reproducing the information recorded on an optical disc 102 as a recording medium.

In the present optical disc 102, an information recording surface 106 is formed on a transparent substrate 104 and is protected by a protective film 108.

In this state, a light beam LA1 incident from the transparent substrate 104 is converged on the information recording surface 106 and the information recorded on the recording surface 106 may be reproduced based on a light beam LA2 reflected from the recording surface 106.

Thus the light beam LA1 is radiated from a laser light source 110 and collimated by a collimator lens 112 into a collimated light beam which is directed via object lens 114 onto the optical disc 102.

The light beam LA2 reflected from the optical disc 102 is directed via object lens 114 to a beam splitter 116 where the light beam LA2 is separated from the light beam LA1 so and guided via a converging lens 117 to a light-receiving element 118.

In the optical disc recording/reproducing apparatus 101, clock signals are extracted from output signals S1 of the light-receiving element 118 and signal processing is performed on the basis of these clock signals for reproducing the information recorded on the information recording surface 106.

The object lens 114 is moved vertically and horizontally based on an output signal S1 from the light-receiving element 115 for effectively avoiding tracking and focusing errors. That is, the focusing and tracking error signals are produced on the basis of the detection output of the light-receiving element 118. The object lens is driven on the basis of these focusing error signals and tracking error signals in a direction parallel to the optical axis of the object lens, i.e. in the focusing direction, and in a direction at right angles thereto, that is in the tracking direction, by an object lens driving device, not shown.

A wavefront correcting plate 120 consisting in a piezoelectric element is interposed between the collimator lens 112 and the beam splitter 116 and is driven for correcting the coma aberration.

That is, the magnitude of the coma aberration may be evaluated by a coma aberration coefficient $W_{31}$, with the coma aberration coefficient $W_{31}$ on tilting of the optical disc 102 being indicated by the formula $$W_{31} = \frac{t}{2} \frac{(N^2-1)N^2\sin\theta\cos\theta}{(N^2-\sin^2\theta)^{5/2}} NA^3 = \frac{t}{2} \frac{N^2-1}{N^3} NA^3\theta \quad (1)$$

where N is a refractive index of the transparent substrate 104, t the thickness of the transparent substrate 104, θ the tilt of the optical disc 102 and NA the numerical aperture of the object lens 114.

That is, if the tilt is an extremely small angle, the magnitude of the coma aberration is linearly changed with the tilt.

Figure 9:
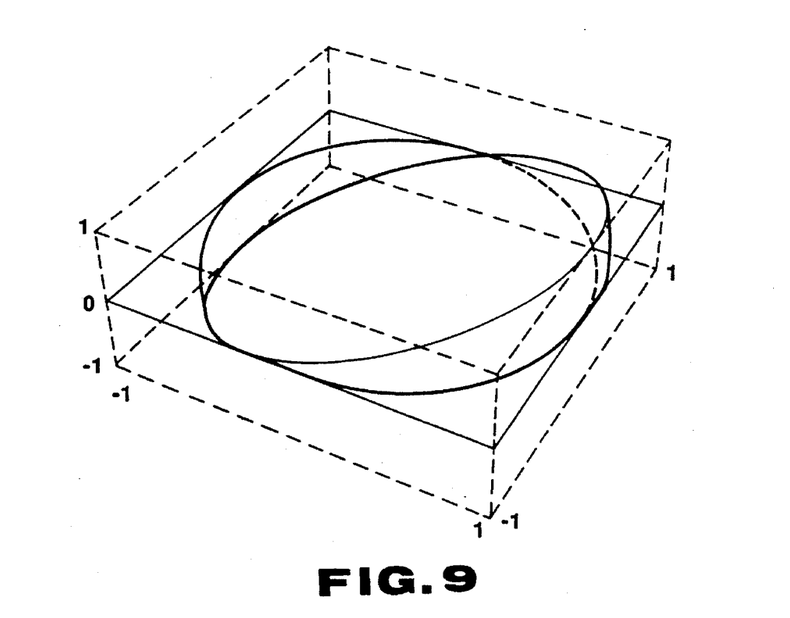
FIG. 9 is a perspective view for illustrating the coma aberration produced in the embodiment shown in FIG. 8.

Besides, the coma aberration itself may be expressed by the formula $$W_{31}r^3 \cos\phi \quad (2)$$

using a pupil-shaped polar coordinate $(r, \phi)$. The coma aberration may be schematized as shown in FIG. 9 as a wavefront on a plane of incidence of the object lens 114, wherein the radius of the pupil is normalized to 1 with the coma aberration coefficient $W_{31}$ being indicated as 1.

Consequently, for preventing the coma aberration at the information recording surface 106, it suffices to produce the aberration shown by the formula $$f(r,\phi)=-W_{31}r^3 \cos\phi \quad (3)$$

by means of the wavefront correcting plate 120.

Utilizing this relationship an aberration approximate to that of the formula (3) is produced by the wavefront correcting surface 120 and is used for canceling the aberration caused by the tilt of the optical disc 102 for correcting the coma aberration of the information recording surface within the range of generally observed disc tilt.

Figure 10:
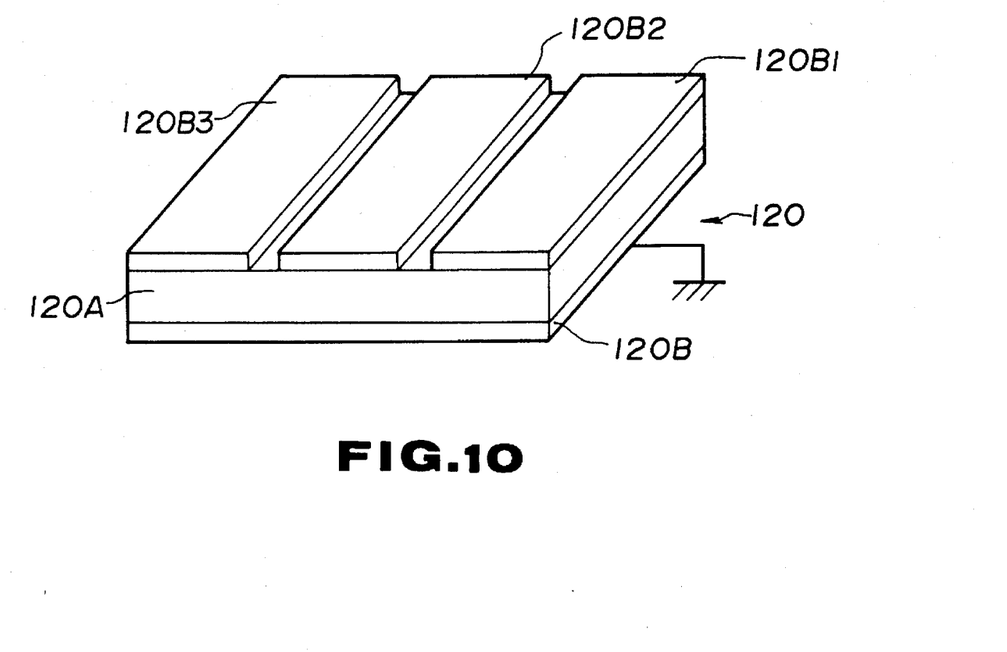
FIG. 10 is a perspective view showing a wavefront correcting plate employed in the embodiment shown in FIG. 8.

Referring to FIG. 10, the wavefront correcting plate 120 is comprised of transparent electrodes 120B, 120B1, 120B2, 120B3 formed on the upper and the lower sides of a transparent crystal 120A of a perovskite structure composed of oxides of lead, lanthanum, zirconium or titanium. The area through which the light beam LA1 is transmitted is divided into three regions covered by the transparent electrodes 120B1 to 120B3.

The wavefront correcting plate 120 is maintained so that the arraying direction of the three regions is parallel to the radial direction of the optical disc. An electrical voltage corresponding to the tilt of the optical disc 102 is applied across each of these regions.

Figure 11:
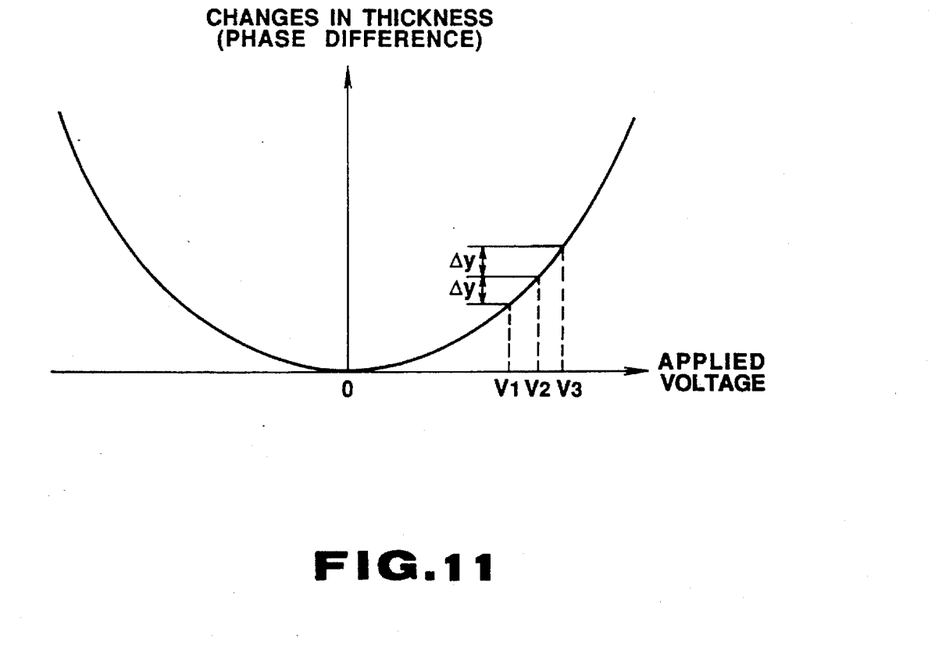
FIG. 11 is a graph showing the characteristics of the wavefront correcting plate.

That is, with this type of the piezoelectric device, the plate thickness is changed depending on the applied voltage, as shown in FIG. 11.

Consequently, when the plate 120 is inserted in a light path of the light beam LA1, the plate thickness is changed as a function of the applied voltage, so that the length of the light path of the light beam LA1 is changed for each of the transparent electrodes 120B1 to 120B3.

Figure 12:
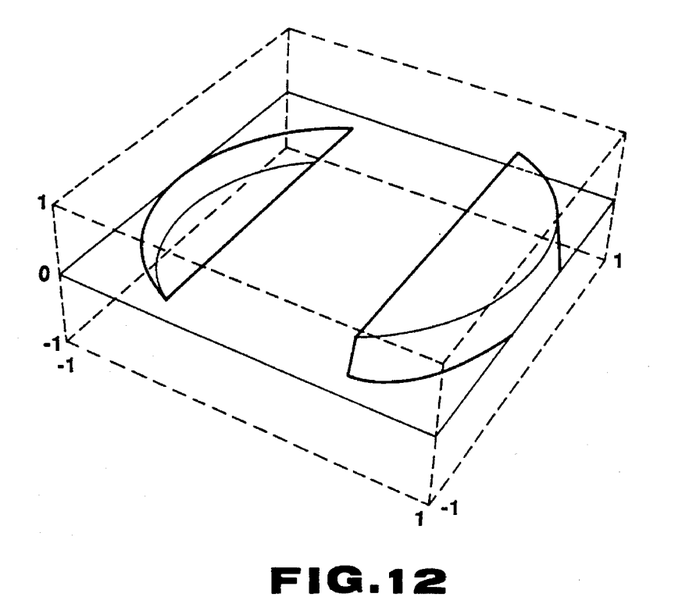
FIG. 12 is a schematic perspective view showing the wavefront aberration of the wavefront correcting plate.

If, in this case, the central electrode 120B2 is maintained at a reference voltage V2, and voltages V1, V3 lower and higher than the reference voltage, respectively, are applied across the left and right electrodes 120B1 and 120B3, it becomes possible to form a wavefront shown in FIG. 12 by the wavefront correcting plate 120.

Consequently, by setting the changes in the wavefront for correcting changes in the wavefront produced on tilting of the optical disc 102, it becomes possible to correct the coma aberration on the information recording surface.

Based on this correcting principle, in the present optical disc recording/reproducing apparatus 101, a beam splitter 122 is interposed between the beam splitter 116 and the laser light source 110 for producing a split beam LA3 from the reflected light beam LA1.

The split reflected light beam LA3 is guided via a light barrier plate 124 to a light receiving device 126.

Figure 13:
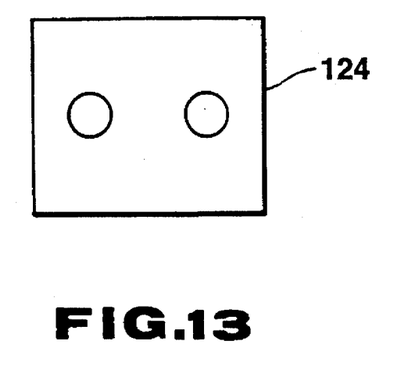
FIG. 13 is a front view showing light barrier plate employed in the embodiment shown in FIG. 8.

Referring to FIG. 13, the light barrier plate 124 is a plate-shaped member having left and right pinholes and is maintained at a conjugate position with respect to the information recording surface 106.

Besides, the light barrier plate 124 is maintained so that the pinhole arraying direction corresponds to the arraying direction of the transparent electrodes 120B1 to 120B3 of the wavefront correcting plate 120.

In this manner, in the optical disc recording/reproducing apparatus, if the coma aberration is produced on the information recording surface 106 in the pinhole arraying direction, a coma aberration is similarly produced on the light barrier plate 124 so that the volume of light transmitted through the pinholes is changed with the amount of the coma aberration.

Figure 14:
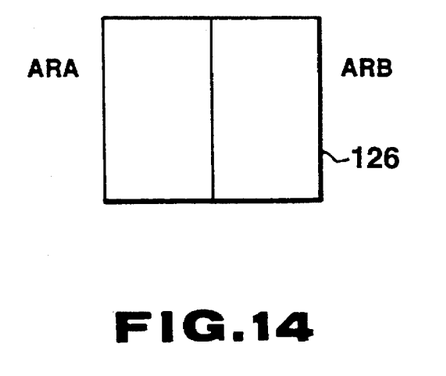
FIG. 14 is a front view showing a light receiving device employed in the embodiment shown in FIG. 8.

Referring to FIG. 14, the light receiving device 126 has its light receiving surface divided in left and right regions such that the light transmitted through the pinholes of the light barrier plate 124 is incident on these regions. A subtracting circuit 128 performs a subtracting operation on output signals S1A, S1B of the light-receiving regions ARA, ARB, respectively, and outputs the results of the subtraction to a correction voltage generating circuit 134.

The correcting voltage generating circuit 134 maintains the central electrode 120B2 at a predetermined reference voltage V2 and, based on the results of subtraction performed by the subtracting circuit 128, generates first and second driving voltages V1, V3 which vary about the reference voltage as a center. The driving voltages V1, V3 are applied to the left and right electrodes 120B1, 120B3, respectively.

Figure 15:
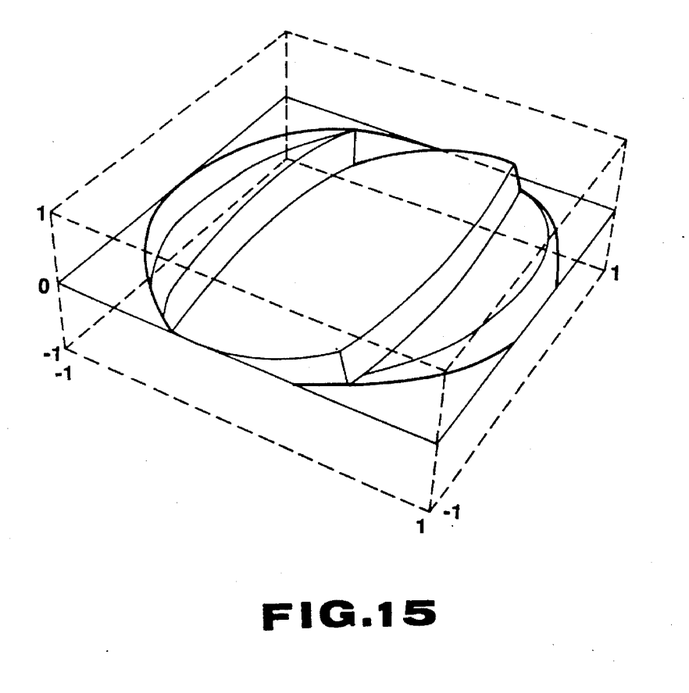
FIG. 15 is perspective view showing the results of correction of the wavefront aberration achieved with the embodiment shown in FIG. 8.

By correcting the wavefront in this manner, the coma aberration may be approximately corrected, as shown in FIG. 15.

However, by this correction, the wavefront aberration shown in FIG. 15 may be reduced to one half in terms of the peak value and to about one-seventh in terms of a mean square value of the regions, as compared to the aberration shown in FIG. 9, to achieve a practical and sufficient correction.

Consequently, in the present optical disc recording/reproducing apparatus, the coma aberration may be easily corrected by simply controlling the applied voltage based on the results of detection of the coma aberration. When the tilt of the optical disc is changed acutely, the coma aberration may be continually corrected to follow the changes in the disc tilt.

Therefore, the recorded information may be reproduced reliably by a simplified arrangement even with greater recording density optical discs.

In the above arrangement, the light beam LA1 outgoing from the laser light source is collimated by a collimator lens 112 into a collimated light beam to which a predetermined wavefront aberration is applied by the wavefront correcting plate 120 before the light beam is collected by object lens 114 on the information recording surface 106.

In distinction from the light beam LA1, the reflected light beam LA2 reflected from the optical disc 102 is directed via object lens 114 to the beam splitter 116 so as to be transmitted to the light receiving element 118 after reflection by the beam splitter 116.

The information recorded on the information recording surface is reproduced on the basis of output signal S1 of the light receiving element 118.

The reflected light beam LA2 is transmitted through the wavefront correcting plate 120 and separated by the beam splitter 122 from the light beam LA1. The separated light beam is led to the light barrier plate 124 and thence to the light receiving element 126 via its pinholes so that the transmitted light volume is changed in dependence upon the coma aberration.

Output signals S1A and S1B of the light receiving element 126 are processed by a subtracting circuit 128 where the coma aberration at the optical disc 102 is detected and the driving voltages VI to V3 are generated in the correcting voltage generating circuit 134 based on the results of the subtraction.

In the optical disc recording/reproducing apparatus 101, the thickness of the wavefront correcting plate 120 is controlled by the driving voltages V1 to V3, so that the coma aberration produced by the tilt of the optical disc is cancelled by the wavefront aberration of the wavefront correcting plate 120. In this way the coma aberration may be effectively prevented from being produced on the information recording surface 106.

With the above-described arrangement, albeit simplified, the coma aberration may be easily corrected by controlling the thickness of the wavefront correcting plate provided in the parallel light beam between the collimator lens and the object lens and by cancelling the wavefront aberration produced by the disc tilt by the wavefront aberration of the correcting plate, so that the recorded information may be reliably reproduced even at greater recording densities.

Although the correction of the coma aberration in the radial direction has been described in the second embodiment, the present invention may also be applied to correction along the recording track(s) or both in the radial direction and along the recording track(s).

Figure 16:
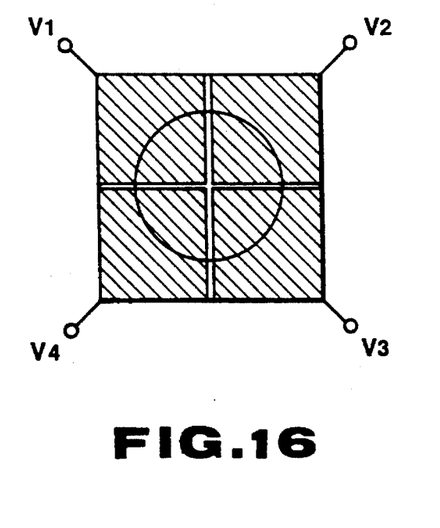
FIG. 16 is a front view showing a wavefront correcting plate according to a third embodiment of the present invention.

The disc recording/reproducing apparatus may also be so designed that, as shown in FIG. 16, the piezoelectric device is divided into four regions for canceling the wavefront aberration in the radial direction and along the recording track(s) by a sole wavefront correcting plate.

Two wavefront correcting plates may also be used for correcting the coma aberration in the radial direction and along the recording track(s).

In the above-described embodiments, the wavefront correcting plate is divided into three regions for correcting the wavefront aberration. However, the correcting plate may also be divided into two regions, if acceptable results of correction may be achieved. The number of divisions of the correcting plate may also be increased.

In the above-described embodiment, the wavefront correcting plate is interposed between the collimator lens and the object lens. However, the correcting plate needs only be disposed at any selected position in the light path of the light beam LA1, such as between the object lens and the optical disc or between the collimator lens and the laser light source.

Although the reflected light beam LA2 is separated from the light beam LA1 at the back of the collimator lens for detecting the coma aberration, the light beam LA2 my be separated at various positions from the light beam LA1 for detecting the coma aberration.

Although the wavefront correcting plate is driven on the basis of the reflected light beam LA2 in the above-described embodiment, it is also possible to detect the tit of the optical disc directly to drive the wavefront correcting plate based on the results of detection.

Although the reflected light beam LA2 is directed in the above embodiment to the light receiving device for reproducing the information signals based on the changes in the light volume, the present invention may also be applied to imaging an optical disc by an image pickup in reproducing the recorded information.

Above all, in a system of forming an enlarged image of the information recording surface by an image pickup, reproduction is rendered difficult if the optical disc is tilted to only a small extent. The present invention may be applied to such a system for reliably reproducing the recorded information.

Although the present invention is applied in the above-described embodiments to read-only disc reproducing apparatus, the present invention may also be applied to an optical disc apparatus in which a light beam is applied at a predetermined timing to the information recording surface for recording and/or reproducing the desired information.

It is noted that the present invention is not limited to the above-described embodiments. For example, referring to FIG. 1, the electrostriction device 20 making use of the piezoelectric plate 21 may be provided at any position of the light path extending from the semiconductor laser 11 as a light source to the magneto-optical disc 16 as an optical recording medium. The recordable optical recording medium may also be a phase-change type optical disc or a card instead of the magneto-optical disc 16. The piezoelectric plate 21 of the electrostriction device 20 may be formed of a transparent material exhibiting electrostriction or piezoelectric effects other than PLZT. The transparent electrode 23 may also be rectangular or polygonal, instead of being circular. Besides, the entire electrode 22 on the back side of the piezoelectric plate may also be divided into a central electrode and a peripheral electrode.

It will be seen from the foregoing description that the present invention provides an optical pickup adapted for radiating a light beam from the light source to an optical recording medium via an object lens for recording/reproducing information signals, in which a focusing error signal, which is an amount of displacement of a focal point along the optical axis, is detected by a signal supplied from co-focal point detecting optical means adapted for receiving the return light from the optical recording medium to enable highly accurate detection of the focusing error within the depth of focus. In addition, since the focusing servo within the depth of focus may performs highly accurately, it becomes possible to perform so-called co-focal point detection in which light detection is performed directly behind a pinhole placed at the focal point of a lens which in turn permits high density reproduction.

The present invention also provides a focusing servo device in which an electrostriction device having a transparent electrode made up of a central section and a peripheral section is disposed between the light source and the optical recording medium. The central transparent electrode section has a potential difference with respect to the peripheral electrode section to produce a phase difference between the center and peripheral regions of the light flux. A focusing error which is an amount of displacement of the focal point position along the optical axis is detected on the basis of a signal from a light receiving element receiving the return light from the optical recording medium. Based on the focusing error detected, a rough servo operation is performed by an object lens driving unit up to the vicinity of the depth of focus, and fine servo is performed by the electrostriction device within the range of the depth of focus. This results in a high accuracy focusing servo which enables a shorter wavelength of the light source and high numerical aperture of the object lens for allowing higher density reproduction by co-focal point detection.

The present invention also provides a disc tilt correcting device in which, by interposing a piezoelectric device in the light path of the light beam and changing the thickness of the piezoelectric device for canceling the coma aberration caused by the tilt of the optical disc, it becomes possible to inhibit coma aberration on the information recording surface despite acute changes in the disc tilt. This correction for disc tilt facilitates reliable recording and/or reproduction of information signals at greater recording densities.

What is claimed is:

1. An optical pickup for recording and/or reproducing desired information on an information recording surface of an optical disc using a light beam incident on the optical disc via a transparent member formed on a surface of the optical disc so that the light beam is converged on said information recording surface, the optical pickup comprising:

a light source for radiating the light beam;

an object lens for converging the light beam outgoing from the light source to the information recording surface; and a transparent electrostriction device, arranged on a path of the outgoing light beam between the light source and the optical disc and divided into a plurality of regions which transmit the light beam, the electrostriction device having the thickness of each of the plurality of regions changed depending on voltages applied across transparent electrodes arranged on upper and lower surfaces thereof:

the voltages applied across the regions being changed depending on a tilt of the optical recording medium in order to correct coma aberrations of the light beam on the information recording surface.

2. The optical pickup as defined in claim 1, further comprising;

a beam splitter for separating the light beam outgoing from the light source and a return light beam from the optical disc;

light detection means for detecting the return light beam; and tilt detection means for detecting the tilt of the optical disc based on a detection output of the light detecting means, a detection output of the tilt detection means being supplied in the form of the voltages to the electrostriction device.

3. The optical pickup as defined in claim 1, wherein the electrostriction device comprises a piezoelectric plate having the transparent electrodes arranged on both sides thereof, one of the electrodes being made up of a central electrode and two peripheral electrodes arranged on opposite sides of the central electrode.

4. The optical pickup as defined in claim 1, wherein the electrostriction device comprises a piezoelectric plate and has the transparent electrodes arranged on both sides thereof, one of the electrodes being formed by four divided electrodes.

5. An optical pickup for recording information on a recording surface of an optical disc and/or reproducing information from the recording surface of the optical disc, the optical pickup comprising:

a light source means for radiating an outgoing light beam on the optical disc;

an object lens means for converging the outgoing light beam on the recording surface of the optical disc;

a piezoelectric plate disposed in the path of the outgoing light beam, having a first surface and a second surface, the piezoelectric plate transmitting the outgoing light beam, with the thickness of the piezoelectric plate between the first surface and the second surface varying with voltage applied across the piezoelectric plate;

at least one transparent first-surface electrode disposed on the first surface of the piezoelectric plate;

a plurality of transparent second-surface electrodes disposed on the second surface of the piezoelectric plate, whereby the thickness of a portion of the piezoelectric plate in the vicinity of each second-surface electrode will depend on a voltage difference between the second-surface electrode and the first-surface electrode; and voltage means for applying a plurality of applied voltages respectively to the first-surface electrode and each of the second-surface electrodes to control the thickness of the piezoelectric plate, so that the outgoing light beam is corrected for coma aberrations on the information recording surface.

6. The optical pickup according to claim 5, further comprising:

light detection means for detecting a return light beam from the recording surface of the optical disc;

wherein the voltage means includes a tilt detection means for detecting the tilt of the optical disc based on the light detected by the light detection means, so that the voltage means applies the applied voltages to correct for coma aberrations caused by the detected tilt of the optical disc.

* * * * *